(12) United States Patent
Shin et al.

(10) Patent No.: US 9,830,496 B2
(45) Date of Patent: Nov. 28, 2017

(54) FINGERPRINT INPUT DEVICE USING PORTABLE TERMINAL HAVING CAMERA AND EXTERNAL OPTICAL DEVICE FOR INPUTTING FINGERPRINT

(71) Applicant: UNIONCOMMUNITY CO., LTD., Seoul (KR)

(72) Inventors: Yo Shik Shin, Seoul (KR); Jong Woo Ahn, Seongnam-si (KR)

(73) Assignee: UNION COMMUNITY CO., LTD., Seoul (KR)

( * ) Notice: Subject to any disclaimer, the term of this patent is extended or adjusted under 35 U.S.C. 154(b) by 0 days.

(21) Appl. No.: 15/107,405

(22) PCT Filed: Feb. 26, 2015

(86) PCT No.: PCT/KR2015/001856
§ 371 (c)(1),
(2) Date: Jun. 22, 2016

(87) PCT Pub. No.: WO2015/130094
PCT Pub. Date: Sep. 3, 2015

(65) Prior Publication Data
US 2017/0228575 A1 Aug. 10, 2017

(30) Foreign Application Priority Data
Feb. 26, 2014 (KR) ........................ 10-2014-0022566

(51) Int. Cl.
*G06K 9/00* (2006.01)
*G06K 9/74* (2006.01)
(Continued)

(52) U.S. Cl.
CPC ......... *G06K 9/0004* (2013.01); *G02B 17/023* (2013.01); *H04W 12/06* (2013.01); *H04W 12/08* (2013.01)

(58) Field of Classification Search
None
See application file for complete search history.

(56) References Cited

U.S. PATENT DOCUMENTS 5,177,802 A * 1/1993 Fujimoto ............. A61B 5/1172
356/71
7,403,271 B2 * 7/2008 Kim ................... G06K 9/00046
356/71
(Continued)

FOREIGN PATENT DOCUMENTS

| JP | 5-266175 A | 10/1993 |
| JP | 7-220041 A | 8/1995 |

(Continued)

OTHER PUBLICATIONS

Korean Office Action dated Jul. 4, 2016, issued by the Korean Patent Office in corresponding application KR 10-2015-0133099.
(Continued)

*Primary Examiner* — Randolph I Chu
(74) *Attorney, Agent, or Firm* — Stein IP, LLC (57) ABSTRACT

Disclosed is a fingerprint input device using a portable terminal equipped with a camera, and an external optical device for inputting a fingerprint. According to the present invention, a fingerprint image may be generated by an optical fingerprint input method by using the external optical device of the present invention even when an existing portable terminal does not have a configuration for an optical fingerprint input. To this end, the external optical device is provided as an external type to be mounted in the existing portable terminal provided with a camera, and has an optical refractor and a mirror. The external optical device may generate a user's fingerprint image by an optical fingerprint input method, in accordance with circumstances,
(Continued)

without interrupting the main use of a camera and an LED of the existing portable terminal.

20 Claims, 5 Drawing Sheets

(51) Int. Cl.
 *G02B 17/02* (2006.01)
 *H04W 12/08* (2009.01)
 *H04W 12/06* (2009.01)

(56) References Cited

U.S. PATENT DOCUMENTS

| | | | | |
|---|---|---|---|---|
| 2004/0026635 A1* | 2/2004 | Lee | ................... | G06K 9/00013 250/556 |
| 2005/0205667 A1* | 9/2005 | Rowe | ................... | A61B 5/1171 235/382 |
| 2005/0271258 A1* | 12/2005 | Rowe | ................ | G06K 9/00046 382/124 |
| 2006/0250605 A1* | 11/2006 | Chern | ................ | G06K 9/00046 356/71 |
| 2007/0189588 A1* | 8/2007 | Kim | ................... | G06K 9/00046 382/127 |
| 2007/0196003 A1* | 8/2007 | Kim | ................... | G06K 9/00899 382/127 |
| 2014/0369575 A1* | 12/2014 | Riopka | .............. | G06K 9/00046 382/127 |
| 2015/0205992 A1* | 7/2015 | Rowe | ................... | G06K 9/2018 382/124 |
| 2017/0200040 A1* | 7/2017 | Riopka | .............. | G06K 9/00046 |

FOREIGN PATENT DOCUMENTS

| | | |
|---|---|---|
| JP | 11-183974 A | 7/1999 |
| JP | 2001-255574 A | 9/2001 |
| JP | 2002-297257 A | 10/2002 |
| JP | 2004-279733 A | 10/2004 |
| JP | 2007-527069 A | 9/2007 |

OTHER PUBLICATIONS

International Search Report dated Jun. 2, 2015, issued to International Application No. PCT/KR2015/001856.

\* cited by examiner

FINGERPRINT INPUT DEVICE USING PORTABLE TERMINAL HAVING CAMERA AND EXTERNAL OPTICAL DEVICE FOR INPUTTING FINGERPRINT

CROSS-REFERENCE TO RELATED APPLICATIONS

This application is a national stage of International Application No. PCT/KR2015/001856, filed Feb. 26, 2015, which claims the benefit of priority to Korean Patent Application No. 10-2014-0022566, filed on Feb. 26, 2014, the disclosures of which are incorporated herein by reference in their entirety.

TECHNICAL FIELD

The present invention relates to a fingerprint input device in which a user's fingerprint image may be inputted by using a portable terminal equipped with a camera, such as a smartphone, and an external optical device for the fingerprint input device.

BACKGROUND ART

It has already become common that user's biological information which has excellent invariance and uniqueness is used for personal authentication using an Information device, and from among the biological information, fingerprint recognition has become the most attention-drawing and generalized authentication means due to the simple structure and comparatively excellent performance thereof. A common method for obtaining fingerprint information is an optical method using an optical refractor such as a prism.

Figure 1:
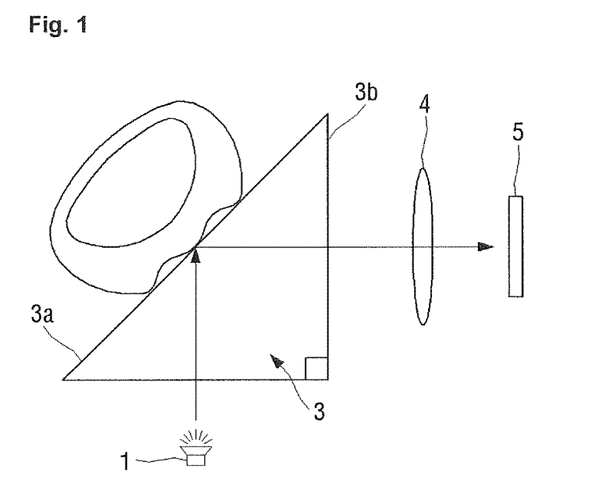
FIG. 1 is a view illustrating an optical fingerprint input device according to a related art.

As illustrated in FIG. 1, an optical fingerprint recognition device according to related arts includes a light source 1 for emitting light for fingerprint recognition, a prism 3 being in contact with a finger, a lens 4 for forming a fingerprint picture which is emitted from the prism 3, and an image sensor 5 for converting the fingerprint picture formed on the lens 4 into an electrical signal. The optical fingerprint recognition devices are classified into the scattering type devices and the absorption type devices according to the disposition structure of the prism 3 and the light source 1.

Light emitted from the light source 1 is incident into the prism 3, forms a fingerprint picture while being reflected, absorbed, or scattered at valleys and ridges of a fingerprint which contacts a fingerprint contact surface 3a of the prism 3, and is then emitted through an emitting surface 3b of the prism 3. The fingerprint picture emitted from the prism 3 is formed on the image sensor 5 through the lens 4 and thus a digital fingerprint picture is obtained.

Since the prism 3 has a triangular cross-sectional surface and changes a light path by a predetermined degrees or more, the fingerprint input device using the prism 3 cannot but have a larger volume than semiconductor type devices or the like even through any methods. Therefore, it is difficult to apply the optical fingerprint input device to a mobile device having a shape of a relatively thin panel.

As an alternative to this, Korean Patent Publication No. 10-2005-0090884 discloses a fingerprint input device which uses an optical refractor which does not have a triangular shape but have a plate shape so as to have a relatively small thickness. In the fingerprint input device, a light source is disposed on a side surface of an optical refractor to obtain a fingerprint picture by using light scattered in the optical refractor. The device uses a thin optical refractor, so that there is an effect of implementing a fingerprint input device with a small overall thickness.

However, referring to FIG. 13 and the description thereof or the like in the invention, it can be understood that the fingerprint input device disclosed in this invention is still implemented through a method in which the device is embedded in a mobile terminal (or a portable terminal). When a fingerprint input device is embedded in the terminal, the thickness of the terminal cannot but have a predetermined size or greater due to the fingerprint input device. Thus, such a related method has a problem in that the method not only cannot satisfy the tendency in which terminals have smaller thicknesses but also cannot be used in terminals which have already been produced and in use.

DISCLOSURE OF THE INVENTION

Technical Problem

An object of the present invention is to provide an external optical device in which a portable terminal such as a smartphone equipped with a camera is used, as it is, to input user's fingerprint to the portable terminal through an optical fingerprint input method, and to thus generate a user's fingerprint image.

Another object of the present invention is to provide an external optical device which may be equipped on a portable terminal when a fingerprint input is required and then may be detached Still another object of the present invention is to provide an optical fingerprint input device using such an external optical device and a portable terminal.

Technical Solution

To achieve the above-described objects, the present invention provides an optical fingerprint input device including: a portable terminal provided with a camera and an LED on a same outer surface; and an external optical device equipped on the same outer surface of the portable terminal.

An external optical device includes an optical refractor, a first mirror, a second mirror, a light blocking part, and a light incident part. The plate-shaped optical refractor is provided with a fingerprint contact surface contacted by the fingerprint at an upper portion thereof, a light incident surface at a lower portion thereof, and an emitting surface at a front end portion thereof, and equipped apart from an upper portion of the LED. The first mirror is provided over the camera part to reflect a fingerprint picture emitted from the emitting surface toward the camera part, and the second mirror is provided to an outer space portion of both side surfaces and a rear surface of the optical refractor to reflect the light emitted from the LED toward the optical refractor. The light blocking part is disposed between the second mirror and the optical refractor to block the light reflected from the second mirror so as not to be directly incident into the optical refractor. Instead, the light incident part is disposed under the light incident surface to allow a portion of the light reflected from the second mirror to be incident onto the light incident surface. Thus, the camera part of the portable terminal generates a fingerprint picture by using the fingerprint picture introduced thereinto after being reflected from the first mirror.

According to an embodiment, the external optical device may further include at least one light path correction means disposed between the emitting surface and the first mirror and configured to reflect or scatter the fingerprint picture emitted from the emitting surface such that a length of a light path from the emitting surface to the camera part is a minimum focal length of the camera part or greater.

For example, the light path correction means may include a third mirror for changing the traveling direction of the fingerprint picture emitted from the emitting surface by about 90°; and a fourth mirror for changing the traveling direction of the fingerprint picture reflected from the third mirror by about 90° to allow the fingerprint picture to be incident onto the first mirror.

The second mirror may be provided outside one surface selected from both side surfaces and the rear surface of the optical refractor, and the light blocking part may be disposed between the second mirror and the selected surface. Here, the light blocking part may be a blocking panel or a blocking wall disposed between the second mirror and the optical refractor, or a blocking layer formed on the selected surface.

Also, the light incident part may be formed in a shape of a slit, or provided in a shape of a diffusion plate. In case of the slit, a mirror may be disposed under the light incident surface to be spaced apart from the optical refractor to form a slit into which a portion of the light reflected from the second mirror is introduced. The mirror may reflect or scatter the light introduced in the slit into allow the light to be incident onto the light incident surface. The diffusion plate may be disposed under the light incident surface to allow the light introduced thereto after being reflected from the second mirror to be incident onto the light incident surface.

The external optical device according to another embodiment of the present invention may include a light source therein to acquiring a fingerprint instead of using an LED of a portable terminal. In this case, the external optical device does not require a second mirror.

Advantageous Effects

According to the present invention, a fingerprint image may be generated by an optical fingerprint input method by using an external optical device of the present invention even when an existing portable terminal does not have a configuration for optical fingerprint input. The external optical device is provided as an exterior type equipped on an existing portable terminal equipped with a camera, and thereby may generate user's fingerprint image, if necessary, without interrupting the main use of the camera and an LED of the portable terminal.

Accordingly, an authentication method using user's fingerprint may be used for many related portable terminals in which a fingerprint input device is not embedded, and thus the security of the device may be improved.

Since the fingerprint input device of the present invention implements an optical system for acquiring a fingerprint image as an exterior type separated from a portable terminal, and the portable terminal does not have an optical system therein, the thickness of the portable terminal may not be limited at least by the optical system.

As the camera part and the LED of a recent portable terminal are disposed very close to each other, the external optical device of the present invention may acquire a fingerprint by receiving light from the LED even when the optical refractor in the external optical device cannot be disposed over the LED.

Also, the external optical device of the present invention secures a light path matched to a focal length or a minimum imaging distance preset in a ready-made portable terminal and thus may acquire fingerprint regardless of kinds of portable terminals.

BRIEF DESCRIPTION OF THE DRAWINGS

FIG. 4 shows (a) a left side view and (b) a front view of the optical refractor of FIG. 2;

MODE FOR CARRYING OUT THE INVENTION

Hereinafter, the present invention will be described in more detail with reference to the accompanying drawings.

Figure 2:
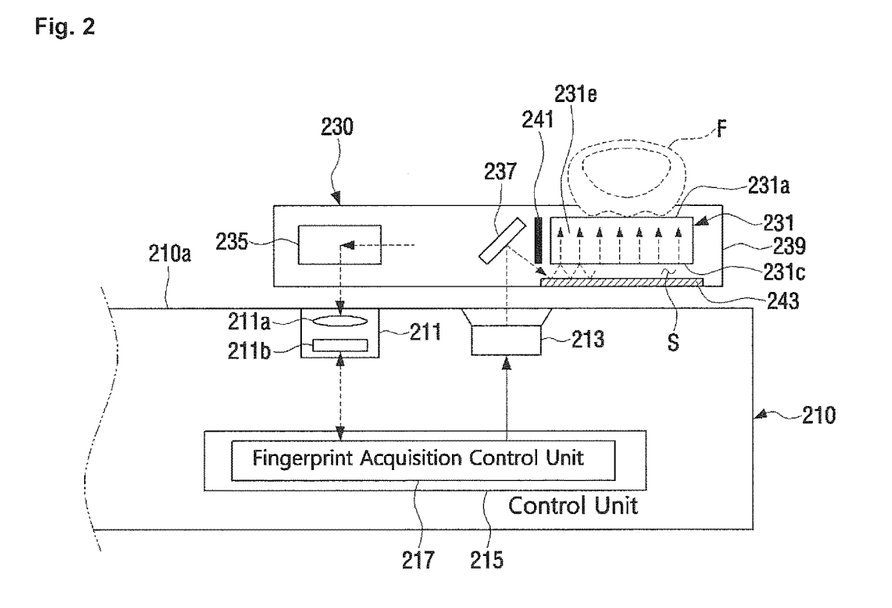
FIG. 2 is a conceptual diagram of a transmission type fingerprint input device according to an embodiment of the present invention.
Figure 3:
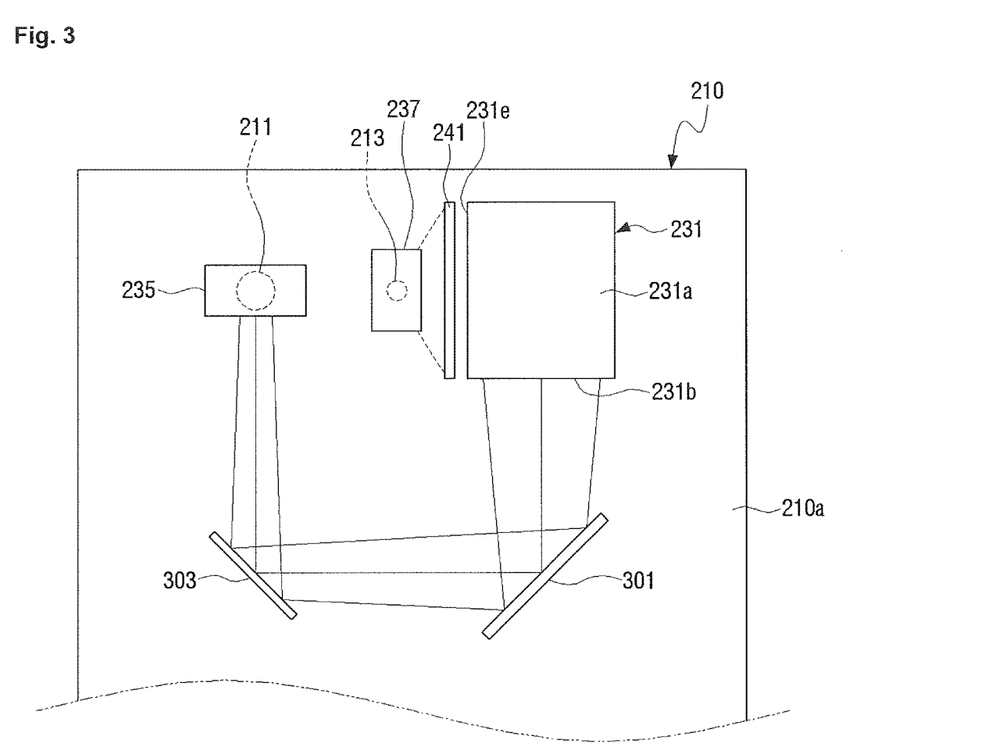
FIG. 3 is a plan view schematically illustrating the external optical device of FIG. 2.

Referring to FIGS. 2 and 3, a fingerprint input device 200 of the present invention includes a portable terminal 210 provided with a camera part 211 and an external optical device 230 externally equipped on the portable terminal 210, wherein the portable terminal 210 obtains a fingerprint image from user's fingerprint contacting the external optical device 230.

The portable terminal 210 embeds a camera part 211 for generating an image by capturing an external subject, may be any one if only capable of performing image processing with respect to the image generated by the camera part 211, and may be a terminal such as a mobile communication terminal or a personal digital terminal having another main function which does not relate to a fingerprint input of the present invention.

Additionally, the portable terminal 210 may also embed an LED 213 for emitting light to the outside together. For example, a recent smartphone is provided with a camera part 211 on the front surface and/or the rear surface thereof and is also provided with an LED 213 on the front surface and/or the rear surface thereof to emit light to the outside.

The fingerprint input device 200 of the present invention uses the camera part 211 of the portable terminal 210 as a basic lens and an image sensor for optical fingerprint input, and uses the LED 213 as a light source for optical fingerprint input. First, the case in which the portable terminal 210 has both the camera part 211 and the LED 213 will be mainly described.

The portable terminal 210 includes the camera part 211, the LED 213, and the control unit 215. As described above, the portable terminal 210 may of course include a configuration relating to the main function thereof, but this configuration or function not only is not essential to the present invention but also does not contribute to the description of the present invention, and therefore is not illustrated in the drawings, and the description thereof is also not provided In the present invention, the camera part 211, in addition to an original function thereof in which the camera part is provided with a basic lens 211$a$ and an image sensor 211$b$ to generate an image of an external subject, generates a fingerprint image from a fingerprint picture inputted from the external optical device 230 and provides the fingerprint image to the control unit 215.

The camera part 211 is generally provided with a automatic focus adjusting function to generate an image by adjusting a focus with respect to a subject having a distance of a predetermined minimum focal length (or minimum distance for taking a picture) or more. Thus, when imaging (so called, close-up photographing) a subject within the minimum focal length, the image becomes out of focus.

In the present invention, the LED 213, in addition to the main function in the portable terminal 210, functions to emit light for generating an optical fingerprint image to the external optical device 230. The examples of FIGS. 2 and 3 are examples in which the camera part 211 and the LED 213 are disposed in parallel on a same outer surface of the portable terminal 210 to be exposed together. In case of a recently introduced portable phone or the like, the LED 213 and the camera part 211 are disposed very close to each other, so that the linear distance therebetween is generally less than the minimum focal length.

As described above, the portable terminal 210 is not necessarily provided with the LED 213 to be used as a light source for fingerprint input, but the LED may be provided in the external optical device 230.

The control unit 215 includes a fingerprint acquisition control unit 217 for controlling the overall process of optical fingerprint input process by using the LED 213 and the camera part 211. The control part 215 may be understood as a configuration especially provided for the present invention, but may be a configuration provided to perform above-mentioned major functions of the portable terminal 210.

As such, when the control part 215 is a configuration provided to perform the major functions of the mobile terminal 210, the control unit 215 may refer to a functional configuration which is implemented by a processor chip which is a fundamental hardware of the mobile terminal 20 and an application which is a software processed by the chip. Here, the application is the software stored in a programming language which may be interpreted by a computer to process the designated sequence of instructions.

Also, the fingerprint acquisition control unit 215 may be a program or an aggregate of a plurality of programs which is installed as one of the applications to be executed by the processor chip to implement the present invention.

Specifically, the fingerprint acquisition control unit 215 controls the camera part 211 to generate an image (here, fingerprint image) while controlling the LED 213 to emit light for fingerprint input. Also, the fingerprint acquisition control unit 215 may extract feature points from the fingerprint image generated and provided by the camera part 211.

The fingerprint acquisition control unit 215 may directly perform the fingerprint authentication process if necessary, and may also provide another exterior device (for example, computer) of the portable terminal 210 with the fingerprint image or the feature point data.

The external optical device 230 basically includes an optical refractor, at least one mirror, means for blocking or introducing light, and a housing for accommodating these, and is provided as an exterior type which may be positioned (hereinafter, simply referred to as "equipped") in a predetermined posture with respect to the portable terminal 210. Hereinafter, even when the expression "equipped" is used, it does not mean that the external optical device 230 needs to be directly or mechanically coupled to the portable terminal 210.

The external optical device 230 may further include at least one correction lens or at least one light path correction means (e.g. prism) to introduce light emitted from the optical refractor to the camera part 211, but the correction lens or the light path correction means is not an essential configuration of the present invention.

The external optical device 230 of FIGS. 2 and 3 is an example including an optical refractor 231, a first mirror 235, a second mirror 237, a light path correction means, a light blocking part, a light incident part, and a housing 239, wherein a fingerprint picture is acquired through a so-called transmission type (i.e. scattering type). FIGS. 2 and 3 illustrate a state in which the external optical device 230 is equipped on a portable terminal 210, and the description below also describes the state in which the external optical device 230 is equipped on the portable terminal 210 unless other statements are provided.

First, the housing 239 accommodates the optical refractor 231, the first mirror 235, the second mirror 237, the light path correction means, the light blocking part, and the light incident part, and should have a coupling structure for being equipped on an outer surface 210*a* of the portable terminal 210. However, such a coupling structure does not mean only a direct and mechanical coupling of the housing 239 and the portable terminal 210. For example, as in FIG. 6, when an exterior protective case 601 for protecting the appearance of the portable terminal 210 is provided, the housing may be equipped on the case. Also, even without the case 601, the housing may also be coupled when the external optical device 230 is completely spaced apart from the portable terminal 210.

The optical refractor 231 may be any kind of optical refractors or prisms which include a fingerprint contact surface contacted by a finger F, a light incident surface on which the light emitted from an LED 213 is incident, and an emitting surface from which a fingerprint picture is finally emitted.

Figure 4:
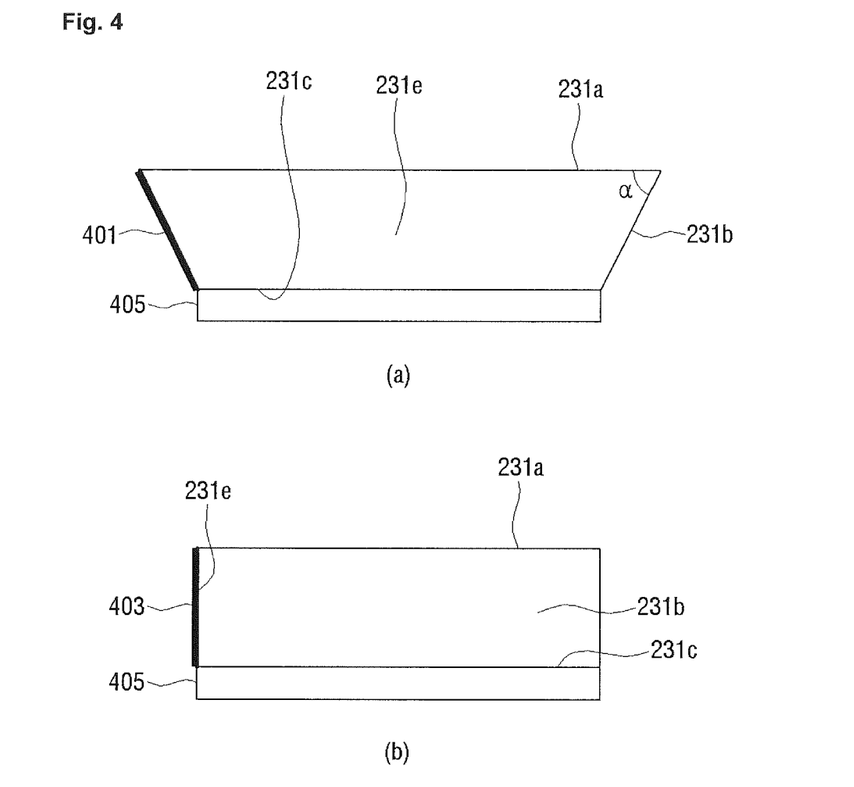

The optical refractor 231 exemplarily illustrated in FIGS. 2 to 4 is provided with: a fingerprint surface 231*a* thereover which is an upper surface; and an emitting surface which is disposed on a front end portion thereof with a slope so as to contact the fingerprint contact surface 231*a* at a predetermined acute angle α. Also, the optical refractor 231 has a shape of flat plate which has a light incident surface 231*c* thereunder, a rear surface 231*d* on a rear end thereof, and side surfaces 231*e* on both side portions connecting the emitting surface 231*b* and the rear surface 231*d*. Preferably, the optical refractor 231 is formed in a plate shape of a hexahedron such that the external optical device 230 may be formed to have a relatively small thickness. FIGS. 4(*a*) and 4(*b*) illustrate a same optical refractor, FIG. 4(*a*) is a left side view, and FIG. 4(*b*) is a front view when viewed from the emitting surface 231*b*. The optical refractor 231 of FIG. 4 may be the same as the optical refractor 231 in FIGS. 2 and 3. However, in FIG. 4(*a*), for convenience of description, the configuration represented by reference number 403 is not illustrated.

Also, on the rear surface 231*d* of the optical refractor 231, as in FIG. 4(*a*), an absorption film 401 for absorbing light to prevent the light for fingerprint recognition from being scattered or reflected is preferably formed. Here, the absorption film 401 may be formed by applying a black paint, or by attaching a light absorbing film. This is because the light scattered or reflected at the rear surface 231*d* is not desirable to the contrast of the fingerprint picture emitted from the emitting surface 231*b*.

To treat light by a transmission type (i.e. scattering type) method, the external optical device 230 is disposed, while being equipped on the portable terminal 210, such that the light emitted from the LED 213 is incident onto a lower surface or one of both side surfaces of the optical refractor 231. Among such configurations, the present invention is an example in which the lower surface of the optical refractor 231 is the light incident surface 231c as in FIG. 2.

However, the optical refractor 231 is not disposed over the LED 213, but is disposed to be spaced apart from an upper side of the LED 213 such that the light incident surface 231c thereof is perpendicular to the optical axis of the light transmitted after being emitted from the LED 213. While the optical refractor 231 is positioned apart from the upper side of the LED 213, the second mirror 237, the light blocking part, and the light incident part are provided to introduce the light emitted from the LED 213 to the light incident surface 231c. Since in such a structure the optical refractor 231 may be disposed at a position spaced apart from the upper side of the LED 213, the camera part 211 and the LED 213 are disposed very close to each other and thus it is useful for a portable terminal in which it is difficult to attach the optical refractor 231 over the LED 213.

The second mirror 237 is provided to one side of an outer space portion of both side surfaces and the rear surface of the optical refractor 231 so as to reflect the light emitted from the LED 213 to the optical refractor 231. The light blocking part is disposed between the second mirror 237 and the optical refractor 231 so as to block the light reflected from the second mirror 237 not to be directly introduced to the optical refractor 231. The light incident part is disposed under the light incident surface 231c to be spaced apart from the optical refractor 231 such that a portion of the light reflected from the second mirror 237 is reflected or scattered so as to be incident onto the light incident surface.

When the second mirror 237 is provided on the one side of the outer space portion of both side surfaces and the rear surface of the optical refractor 231, the second mirror 237 may reflect the light from the LED 213 to any surface of the optical refractor 231 except for the fingerprint contact surface 231a, the emitting surface 231b, and the light incident surface 231c. For example, the light may be introduced toward middle portions of the rear surface 231d of the optical refractor 231 or middle portions of the rear surface 231d and a side surface 231e of the light reflector 231. Preferably, as in the example of FIG. 2, it is advantageous to dispose the second mirror 237 to be positioned over the LED 213 such that the light from the LED 213 is introduced to the one side surface 231e of the optical refractor 231.

The light blocking part is disposed at an outer space portion between the second mirror 237 and the optical refractor 231 to block the light reflected from the second mirror 237 not to be directly incident into the optical refractor 231. The light blocking part may be a blocking panel 241 disposed to be spaced apart from the optical refractor 231 as in FIGS. 2 and 3, or may also be a blocking layer 403 formed through a method or the like in which the blocking layer is formed by being equipped as a film shape or printed with a paint on a surface of the optical refractor 231 as in FIG. 4(b). Corresponding to the second mirror 237 disposed such that the light from the LED 213 is reflected toward one side surface 231e of the optical refractor 231, the blocking panel 241 of FIG. 2 is provided outside the side surface 231e, and the blocking layer 403 of FIG. 4 is formed on the corresponding side surface 231e.

The light incident part is a configuration for introducing the light reflected from the second mirror 237 to the light incident surface 231c of the optical refractor 231 and is provided outside the light incident surface 231c. For example, the light incident part may be, as in FIG. 2, a fifth mirror 243 which is disposed under the light incident surface 231c to be spaced apart from the optical refractor 231 such that a slit s, to which a portion of the light reflected from the second mirror 237 is introduced, is formed and which allows the light introduced to the slit s to be reflected or scattered so as to be incident onto the light incident surface 231c.

As another shape, the light incident part may be, as in FIG. 4, a diffusing plate 405 which is disposed under the light incident surface 231c so as to allow the light reflected from the second mirror 237 and introduced thereto to be incident onto the light incident surface 231c.

When the external optical device 230 is equipped in a predetermined posture with respect to the portable terminal 210, the light path correction means forms a light path between the emitting surface of the optical refractor 231 and the first mirror 235 to allow the light (i.e. fingerprint picture) emitted from the optical refractor 231 to be incident onto the first mirror 235. The fingerprint picture incident onto the first mirror 235 is introduced to the camera part 211 to be generated as a fingerprint picture. The length of the light path between the optical refractor 231 and the camera part 211 should be the minimum focal length or greater by the light path correction means.

As the light path correction means, at least one mirror, prism, lens, or the like may be used. FIGS. 2 and 3 are examples in which a third mirror 301 and a fourth mirror 303 are used as the light path correction means. The third and fourth mirrors 301 and 303 are illustrated as being disposed between the emitting surface of the optical refractor 231 and the first mirror 235, but such disposition is, of course, an example.

The third mirror 301 allows the traveling direction of the fingerprint picture emitted from the emitting surface 231b to be changed by about 90° to be incident onto the fourth mirror 303, and the fourth mirror 303 allows the traveling direction of the fingerprint picture reflected from the third mirror 301 to be changed again by about 90° to be incident onto the first mirror 235. Such disposition is possible if the optical axis of the fingerprint picture emitted from the emitting surface 231b does not pass through the center of the camera part 211.

The third and fourth mirrors 301 and 303 are disposed such that the length of the light path passing through the emitting surface 231b of the optical refractor 231→the third mirror 301→the fourth mirror 303→the first mirror 235→the camera part 211 is the minimum focal length (or minimum imaging distance) or greater.

Consequently, the shape and disposition relation of the light path correction means provided in the external optical device 230 may be different according to (a) the disposition relation between the camera part 211 and the LED of the portable terminal 210, (b) the shape and disposition direction of the optical refractor 231, (c) whether the fingerprint input method is the transmission type (scattering type) or the absorption type, (d) the minimum focal length of the camera part 211, (e) whether the LED 213 is embedded in the portable terminal or in the external optical device 230, or the like.

Hereinafter, on the basis of the examples of FIGS. 2 and 3, the operation of the fingerprint input device 200 provided with the external optical device 230 will be described.

The fingerprint acquisition process is started by the control of the fingerprint acquisition control unit 217. The fingerprint acquisition control unit 217 starts the fingerprint acquisition process by turning on the LED 213, and controls the camera part 211 to generate a fingerprint image.

The light from the LED 213 travels toward the optical refractor 231 by the second mirror 237, but is blocked by the blocking panel 241 which is the light blocking part so as not to be directly incident into the optical refractor 231. However, a portion of the light reflected from the second mirror 237 is introduced to the slit s, and is reflected or scattered by the fifth mirror 243, which constitutes the slit s, to be incident onto the light incident surface 231c.

The light converted into a fingerprint picture inside the optical refractor 231 is emitted through the emitting surface 231b, and is then reflected by each of the third mirror 301 and the fourth mirror 303 to be incident onto the first mirror 235. The first mirror 235 reflects the incident fingerprint picture after being reflected from the fourth mirror 303 toward the camera part 211, and the camera part 211 generates a fingerprint image by using the fingerprint picture.

Since the light emitted from the LED 213 is incident onto the fingerprint contact surface 231a of the optical refractor 231 at an angle smaller than the critical angle while passing through the light incident surface 231c, the fingerprint image is mainly formed by the light scattered at a ridge portion of the fingerprint contacting the fingerprint contact surface 231a, so that an image with a good contrast is formed such that valleys are dark and ridge lines are bright.

EXAMPLE 1

The Case in Which a Light Source is Embedded in the External Optical Device

Figure 5:
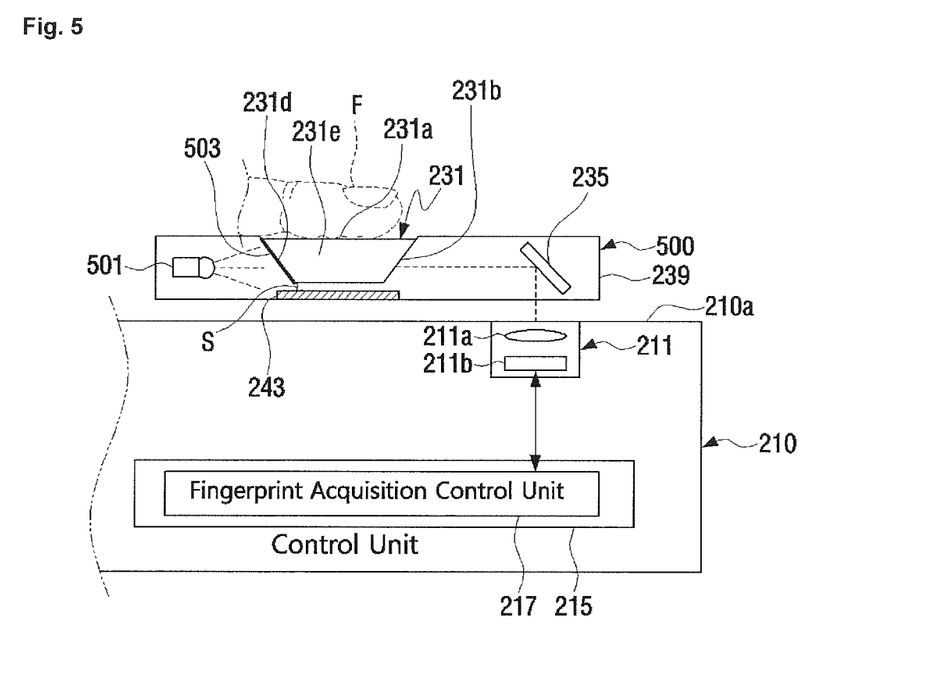
FIG. 5 is a conceptual diagram of a transmission type fingerprint input device according to another embodiment of the present invention.

According to another embodiment, a separate LED for emitting light for fingerprint input is embedded in the external optical device itself. In this case, the second mirror 301 is not required, and the portable terminal 210 does not need to be provided with the LED 213.

Referring to FIG. 5, an external optical device 500 is provided with a light source 501, an optical refractor 231, a light blocking layer 403 which is a light blocking part, a first mirror 235, and a fifth mirror 243. Here, the optical refractor 231, the first mirror 235 and the fifth mirror 243 have the same configurations as the optical refractor 231, the first mirror 235 and the fifth mirror 243 of FIG. 2.

The light source 501 is provided to an outer space portion of the optical refractor 231 to emit light toward the optical refractor 231. For example, the light source 501 may be provided outside one surface selected from both side surfaces 231e and the rear surface 231e of the optical refractor 231. In FIG. 5, since the light source 501 is provided outside the rear surface 231e, the blocking layer 403 is provided not on the side surface 231e of the optical refractor 231 but on the rear surface 231e of the optical refractor 231.

Of course, the external optical device 500 may be provided with a battery therein for supplying power for operating the light source 501 or a cable for supplying direct current power from the portable terminal 210, for example, a USB cable or the like.

EXAMPLE 2

The Attachment Structure of the External Optical Device

Hereinafter, a method for attaching the external optical device 230 and the portable terminal 210 will be described. Most importantly, camera part 211 and the LED 213 of the portable terminal 210 should be normally opened so as to contribute to the main purpose of the portable terminal 210. Accordingly, the external optical device 230 should be opened such that the camera part 211 and the LED 213 of the portable terminal 210 are exposed to the outside except for the time when being equipped on the portable terminal 210 to input a fingerprint picture.

Figure 6:
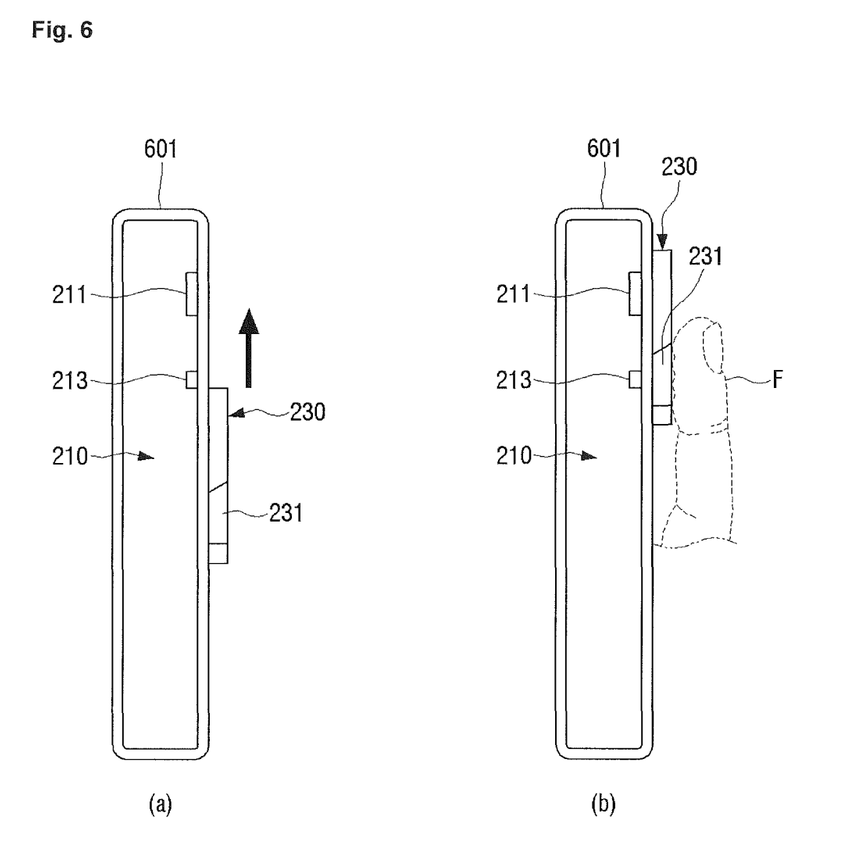
FIG. 6 is a view provided to describe a method for attaching an external optical device of the present invention.

A first method is the method in which the external optical device 230 is equipped and detached through a sliding method. FIG. 6 is such an example, and FIG. 5(a) illustrates a state in which a camera part 211 and an LED 213 are exposed to the outside, and FIG. 5(b) illustrates a state in which a user may input a fingerprint while an external optical device 230 slides to be equipped on a portable terminal 210 so as to cover the camera part 211 and the LED 213.

Specifically, the external optical device 230 has a shape in which a sliding coupling structure is formed to be coupled to an exterior protective case 601 of the portable terminal 210. Various known sliding structures may be selected as the sliding structure if only being structured such that the equipped position of the external optical device 230 is positioned at a preset position.

A second method is the method in which the external optical device 230 is equipped by being inserted to one side of the portable terminal 210 when a fingerprint input is required. For example, the LED 213 of the portable terminal 210 is disposed at the front surface of the terminal, and the camera part 211 is disposed at the rear surface of the terminal.

The external optical device 230 may further include a light path correction means to allow the light emitted from the optical refractor 231 to be incident into the camera part 211.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An external optical device equipped on a same outer surface of a portable terminal provided with an LED and a camera part on the same outer surface to acquire a user's fingerprint image, the external optical device comprising:
   a plate-shaped optical refractor provided with
      a fingerprint contact surface contacted by the fingerprint at an upper portion thereof,
      a light incident surface at a lower portion thereof, and
      an emitting surface at a front end portion thereof, and equipped apart from an upper portion of the LED;
   a first mirror provided over the camera part to reflect a fingerprint picture emitted from the emitting surface toward the camera part;
   a second mirror provided to an outer space portion of side surfaces or a rear surface of the optical refractor to reflect the light emitted from the LED toward the optical refractor;
   a light blocking part disposed between the second mirror and the optical refractor to block the light reflected from the second mirror so as not to be directly incident into the optical refractor; and a light incident part disposed under the light incident surface to allow a portion of the light reflected from the second mirror to be incident onto the light incident surface.

2. The external optical device of claim 1, further comprising
at least one light path correction means disposed between the emitting surface and the first mirror and configured to reflect or scatter the fingerprint picture emitted from the emitting surface such that a length of a light path from the emitting surface to the camera part is a minimum focal length of the camera part or greater.

3. The external optical device of claim 2, wherein the light path correction means comprises:
a third mirror for changing the traveling direction of the fingerprint picture emitted from the emitting surface by about 90° ; and
a fourth mirror for changing the traveling direction of the fingerprint picture reflected from the third mirror by about 90° to allow the picture to be incident onto the first mirror.

4. The external optical device of claim 2, wherein
the second mirror is provided outside one surface selected from both side surfaces and the rear surface of the optical refractor, and
the light blocking part is disposed between the second mirror and the selected surface.

5. The external optical device of claim 4, wherein the light blocking part is a blocking panel or a blocking wall disposed between the second mirror and the optical refractor, or a blocking layer formed on the selected surface.

6. The external optical device of claim 1, wherein the light incident part is disposed under the light incident surface to be spaced apart from the optical refractor to form a slit into which a portion of the light reflected from the second mirror is introduced, and reflects or scatters the introduced light to allow the light to be incident onto the light incident surface.

7. The external optical device of claim 1, wherein the light incident part is disposed under the light incident surface and allows light introduced thereinto after being reflected from the second mirror to be incident onto the light incident surface.

8. An external optical device equipped on a same outer surface of a portable terminal provided with an LED and a camera part on the same outer surface to acquire a user's fingerprint image, the external optical device comprising:
a plate-shaped optical refractor provided with
a fingerprint contact surface contacted by the fingerprint at an upper portion thereof,
a light incident surface at a lower portion thereof, and
an emitting surface at a front end portion thereof;
a light source provided to an outer space portion of both side surfaces and a rear surface of the optical refractor to emit light for acquiring the fingerprint image;
a light blocking part for blocking the light emitted from the light source so as not to be directly incident into the optical refractor;
a light incident part disposed under the light incident surface to allow the light from the light source to be incident onto the light incident surface; and
a first mirror provided over the camera part to reflect a fingerprint picture emitted from the emitting surface toward the camera part.

9. The external optical device of claim 8, further comprising at least one light path correction means disposed between the emitting surface and the first mirror and configured to reflect or scatter the fingerprint picture emitted from the emitting surface such that a length of a light path from the emitting surface to the camera part is a minimum focal length of the camera part or greater.

10. The external optical device of claim 9, wherein the light path correction means comprises:
a third mirror for changing the traveling direction of the fingerprint picture emitted from the emitting surface by about 90' ; and
a fourth mirror for changing the traveling direction of the fingerprint picture reflected from the third mirror by about 90° to allow the picture to be incident onto the first mirror.

11. The external optical device of claim 10, wherein
the light source is provided outside one surface selected from both side surfaces and the rear surface of the optical refractor, and
the light blocking part is disposed between the light source and the selected surface.

12. The external optical device of claim 11, wherein the light blocking part is a blocking panel or a blocking wall disposed between the light source and the optical refractor, or a blocking layer formed on the selected surface.

13. The external optical device of claim 8, wherein the light incident part is disposed under the light incident surface to be spaced apart from the optical refractor to form a slit into which a portion of the light from the light source is introduced, and reflects or scatters the introduced light to allow the light to be incident onto the light incident surface.

14. The external optical device of claim 8, wherein the light incident part is disposed under the light incident surface and allows the light from the light source to be incident onto the light incident surface.

15. An optical fingerprint input device for acquiring a user's fingerprint image, the input device comprising
a portable terminal provided with a camera part and an LED on a same outer surface, and
an external optical device equipped on the outer surface of the portable terminal,
the external optical device comprising:
a hexahedron-shaped optical refractor provided with
a fingerprint contact surface contacted by the fingerprint at an upper portion thereof,
a light incident surface at a lower portion thereof, and
an emitting surface at a front end portion thereof, and equipped apart from an upper portion of the LED;
a first mirror provided over the camera part to reflect a fingerprint picture emitted from the emitting surface toward the camera part;
a second mirror provided to an outer space portion of both side surfaces and a rear surface of the optical refractor to reflect the light emitted from the LED toward the optical refractor;
a light blocking part disposed between the second mirror and the optical refractor to block the light reflected from the second mirror so as not to be directly incident into the optical refractor; and
a light incident part disposed under the light incident surface to allow a portion of the light reflected from the second mirror to be incident onto the light incident surface.

16. An optical fingerprint input device for acquiring a user's fingerprint image, the input device comprising
a portable terminal provided with a camera part on an outer surface thereof, and
an external optical device equipped on the outer surface of the portable terminal, the external optical device comprising:
- a plate-shaped optical refractor provided with
  - a fingerprint contact surface contacted by the fingerprint at an upper portion thereof,
  - a light incident surface at a lower portion thereof, and
  - an emitting surface at a front end portion thereof;
- a light source provided to an outer space portion defined by both side surfaces and a rear surface of the optical refractor to emit light for acquiring the fingerprint image;
- a light blocking part for blocking the light emitted from the light source so as not to be directly incident into the optical refractor;
- a light incident part disposed under the light incident surface to allow the light emitted from the light source to be incident onto the light incident surface; and
- a first mirror for reflecting a fingerprint picture emitted from the emitting surface toward the camera part.

17. The external optical device of claim 1, wherein
the second mirror is provided outside one surface selected from both side surfaces and the rear surface of the optical refractor, and
the light blocking part is disposed between the second mirror and the selected surface.

18. The external optical device of claim 17, wherein the light blocking part is a blocking panel or a blocking wall disposed between the second mirror and the optical refractor, or a blocking layer formed on the selected surface.

19. The external optical device of claim 8, wherein
the light source is provided outside one surface selected from both side surfaces and the rear surface of the optical refractor, and
the light blocking part is disposed between the light source and the selected surface.

20. The external optical device of claim 8, wherein the light blocking part is a blocking panel or a blocking wall disposed between the light source and the optical refractor, or a blocking layer formed on the selected surface.

* * * * *